Sept. 11, 1934.  J. G. RIEFF  1,973,417
GARDEN TOOL
Filed March 24, 1933
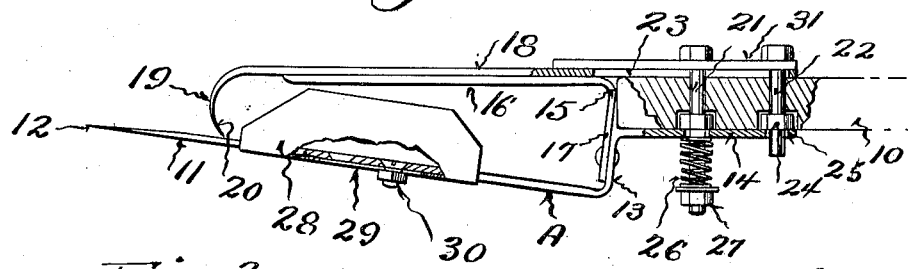
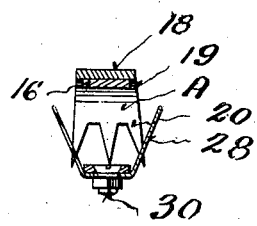
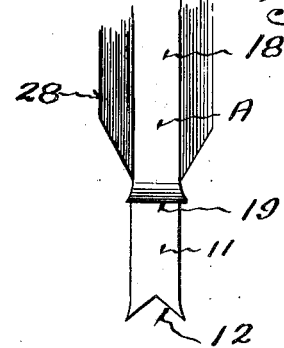
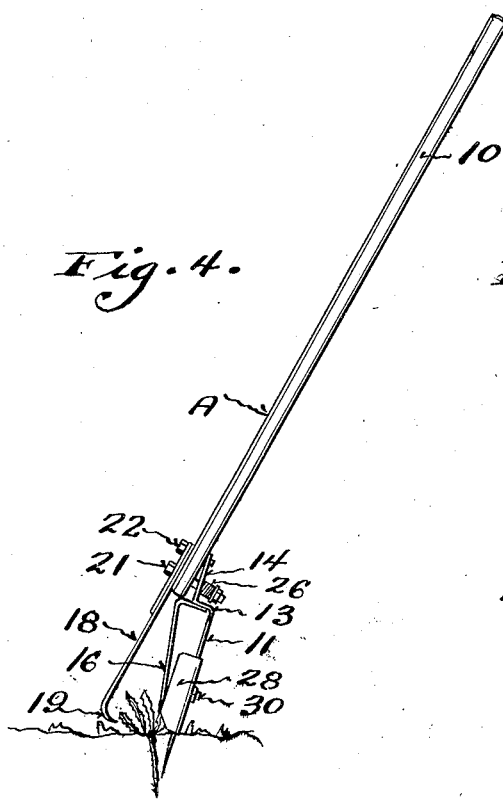
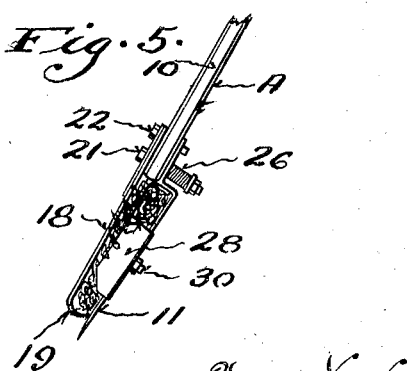
Inventor
J. G. Rieff
By
Attorneys Patented Sept. 11, 1934

1,973,417

UNITED STATES PATENT OFFICE 1,973,417

GARDEN TOOL

John G. Rieff, London, Wis.

Application March 24, 1933, Serial No. 662,480

4 Claims. (Cl. 55—65)

This invention appertains to garden tools, and has for its primary object the provision of a novel weed digger and puller, so constructed that weeds can be readily removed from the ground in an expeditious manner, with expenditure of a minimum amount of effort on the part of the user, the tool entirely eliminating the necessity of the user bending over.

Another salient object of my invention is to provide a weed digger and puller having an elongated blade for insertion into the ground and alongside of the weed to be pulled, with novel means arranged to cooperate with the blade for firmly gripping and clamping the weed, whereby the entire weed can be removed, all of the parts being mounted on an elongated operating handle.

A further important object of my invention is to provide novel means carried directly by the handle for receiving and collecting the weeds as the same are pulled from the ground, whereby a plurality of the pulled weeds can be dumped at one time into a suitable receptacle, which may be carried along side of the operator.

A further object of my invention is to provide a novel weed digger and puller, embodying an elongated operating handle, having pivotally mounted thereon an elongated digging and inserting blade, and a rigid gripping claw, the blade being adapted to move relative to the handle, whereby the claw can be opened relative to the blade for permitting the weed to extend between the blade and claw, and thereafter gripped by said blade and claw to facilitate the removal thereof from the ground.

A further important object of my invention is the provision of means whereby the various parts can be adjusted so as to limit the insertion of the digging blade into the ground, and to facilitate the engagement of the tool with various kinds of weeds.

A still further object of my invention is to provide an improved weed digger and puller of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:—

Figure 1 is a fragmentary side elevation of the front end of my improved tool, parts thereof being shown broken away and in section to illustrate the structural details.

Figure 2 is a detail transverse section through the working end of my device.

Figure 3 is a fragmentary front elevation of the forward end of my improved device.

Figure 4 is a side elevation of my complete device, showing the same on a small scale, and illustrating the manner of using the same.

Figure 5 is a view similar to Figure 4, showing the tool after a plurality of weeds have been pulled and collected thereby.

Referring to the drawing in detail, wherein similar reference characters designate corresponding parts throughout the several views, the letter A generally indicates my improved device, which comprises an elongated operating handle 10, which can be formed from wood, or the like. Carried by the extreme lower end of the handle is arranged my novel means for digging and pulling up the weeds. This means embodies an elongated digging blade 11 having its extreme forward end provided with a cutting edge 12. This cutting edge is preferably bifurcated so as to form a pair of V-shaped inserting teeth, which facilitates the entrance of the blade into the ground with expenditure of a minimum amount of energy on the part of the operator.

Formed directly on the inner end of the blade is an inwardly directed, offset arm 13, terminating in a flat attaching leg 14. The blade 11 extends at an acute angle to the leg 14, for a purpose which will be later set forth. Rigidly secured to the offset arm 13 is an angle-shaped strap 15. This strap includes the relatively long leg 16 and the relatively short leg 17. As shown, the short leg 17 is riveted, or otherwise secured, to the first-mentioned arm 13 formed on the blade 11. The relatively long leg 16 extends in the same direction as the blade 11, but terminates short of this blade, and the blade and the leg 16 slightly converge toward each other, as clearly shown in Figure 1 of the drawings.

Rigidly connected to the opposite side of the handle from the leg 14 is the flat shank 18 of the weed gripper. The forward end of the shank 18 is provided with an inturned arcuate extension 19, having formed thereon a plurality of relatively sharp weed gripping teeth 20. As disclosed in Figure 2 of the drawing, the teeth are slightly flared relative to one another, so that the same will readily engage all parts of the weed being acted upon. In order to firmly secure the shank of the weed gripper in position, I employ spaced bolts 21 and 22. These bolts 21 and 22 extend through a slot 23 formed in the said shank 18 and through the handle 10. Threaded on the bolts are nuts 24, which are preferably countersunk within the handle, whereby the leg 14 can lie flat against said handle when the same is in its operative position. This leg 14 is provided with enlarged openings 25 for receiving the bolts 21 and 22, and the enlarged openings allow the blade to rock relative to the handle, for a purpose which will be later set forth.

The bolt 21 is of a greater length than the bolt 22, and has arranged thereon an expansion coil spring 26, the terminations of which bear respectively against the leg 14 and an adjusting nut 27. Obviously, the spring 26 functions to hold the leg 14 against the handle 10, and the long leg 16 of the angle strap against the shank 18.

By providing the slot 23 in the shank I am enabled to adjust the weed gripper shank relative to the blade 11, and thus bring about a variation of the degree of insertion of the blade into the ground.

Associated with the blade 11 is a substantially V-shaped guard 28, the wings of which extend toward the long leg 16 of the angle strap. This guard may be provided with a slot 29 through which an adjusting bolt 30 carried by the blade 11 can extend. Thus the guard is firmly mounted on the blade and can be adjusted within certain limits so that the amount of penetration of the blade into the ground can be regulated.

In order to strengthen the tool and the weed gripper 18, I can employ a short length of strap metal 31, and the same may be placed against the shank 18 over the slot 23. The bolts 21 and 22 are employed for holding this brace strap in place.

In use of my improved tool, the handle is held at an angle of forty-five degrees relative to the ground, and the blade is forced into the ground to the desired depth alongside of the weed to be pulled. The handle is now given a rocking movement which acts to move the blade toward the weed and to draw the weed gripper away from the weed, whereby the weed will be disposed between the blade and the weed gripper. The handle can now be relaxed so that the parts will assume their normal position, as shown in Figure 1, which will allow the firm gripping of the weed. The tool can now be elevated and the weed will be easily pulled from the ground.

As the blade 11 and the shank of the weed gripper move toward each other, the top of the weed will be forced under the angle strap, and be disposed between the long leg 16 thereof, the inner face of the blade 11, and the guard 28. When the tool is used to pull the next weed, the first weed is pushed up by said second weed, and consequently the pulled weeds are collected between the angle strap, blade, and guard, as clearly shown in Figure 5. After a plurality of weeds have been pulled, the same can be readily shaken or pushed from the tool into a suitable receptacle which may be provided for that purpose.

From the foregoing description, it can be seen that I have provided a simple yet efficient tool, which will quickly and readily remove weeds from the ground with expenditure of a minimum amount of effort on the part of the operator.

Changes in details may be made without departing from the spirit or scope of this invention, but what I claim as new is:—

1. A garden tool for digging up and pulling weeds comprising a manipulating handle, a digging and inserting blade having its inner end offset, a weed-gripping member having an elongated shank and an inturned gripping claw on the forward end of the shank, the blade having its forward end extending beyond the claw, bolts extending through the shank and handle, means rockably mounting the offset end of the blade on said bolts whereby the blade can be rocked by tilting the handle when the blade is inserted in the ground, and spring means normally urging the blade toward the claw.

2. A garden tool for digging up and pulling weeds comprising a manipulating handle, a digging and inserting blade having its inner end offset, a weed-gripping member having an elongated shank and an inturned gripping claw on the forward end of the shank, the blade having its forward end extending beyond the claw, bolts extending through the shank and handle, means rockably mounting the offset end of the blade on said bolts whereby the blade can be rocked by tilting the handle when the blade is inserted in the ground, spring means normally urging the blade toward the claw, and means associated with the blade for receiving pulled weeds.

3. A garden tool for digging up and pulling weeds comprising a manipulating handle, a digging and inserting blade having its inner end offset, a weed-gripping member having an elongated shank and an inturned gripping claw on the forward end of the shank, the blade having its forward end extending beyond the claw, bolts extending through the shank and handle, means rockably mounting the offset end of the blade on said bolts, spring means normally urging the blade toward the claw, and means associated with the blade for receiving pulled weeds, said means embodying an adjustable guard carried by one face of the blade, and an angle strap movable with the blade and arranged in spaced relation thereto.

4. A weed digger and puller comprising an elongated operating handle, an elongated digging and inserting blade carried by said handle, a weed gripping claw rigidly carried by the handle and terminating short of the forward end of the blade, said digging and inserting blade being rockably mounted on the handle, whereby the blade can be swung relative to the claw by tilting movement of the handle when the blade is inserted in the ground, and spring means normally urging the blade toward the claw.

JOHN G. RIEFF.